United States Patent [19]
Usui

[11] Patent Number: 6,058,079
[45] Date of Patent: May 2, 2000

[54] OPTICAL DISC REPRODUCING APPARATUS FOR PRE-READING RECORDING DATA TO BE REPRODUCED

[75] Inventor: Shunji Usui, Fukushima, Japan

[73] Assignee: Nippon Columbia Co., Ltd., Tokyo, Japan

[21] Appl. No.: 08/962,038

[22] Filed: Oct. 31, 1997

[30] Foreign Application Priority Data

Nov. 20, 1996 [JP] Japan .................................. 8-324795

[51] Int. Cl.$^7$ .................................................. G11B 17/22
[52] U.S. Cl. .................................................. 369/32; 369/48
[58] Field of Search .................................. 369/32, 13, 48, 369/33, 47, 59, 54, 60; 395/440, 480, 439

[56] References Cited

U.S. PATENT DOCUMENTS 5,343,452   8/1994   Maeda et al. .............................. 369/32
5,708,637   1/1998   Umemura et al. ......................... 369/48

*Primary Examiner*—Ali Neyzari
*Attorney, Agent, or Firm*—Dickstein Shapiro Morin & Oshinsky LLP

[57] ABSTRACT

An optical disc reproducing apparatus which is useful and can preliminarily read and edit audio data to be reproduced and output the edited data is provided. The optical disc reproducing apparatus comprising: reproducing means for reproducing recording data of an optical disc; storing means for storing the recording data reproduced from the optical disc; input means for inputting an address of the recording data stored in the storing means; output means of at least one system for outputting the recording data stored in the storing means; and control means for controlling so as to read the recording data from a start address inputted by the input means and output the read data from the output means.

27 Claims, 3 Drawing Sheets

OPTICAL DISC REPRODUCING APPARATUS FOR PRE-READING RECORDING DATA TO BE REPRODUCED

BACKGROUND OF THE INVENTION

Field of the Invention

The present invention relates to an optical disc reproducing apparatus.

A sound is often generated for live broadcasting or the like by a DJ (disc jockey), a broadcasting station, or the like. In order to sequentially generate a plurality of sounds, it is necessary to prepare the next sound to be reproduced during generation of a preceding sound. For instance, a DJ usually must prepare a second musical disc to follow the musical disc already playing so that there is no interruption in the flow of songs.

For example, when there is a stop by a pause during sounds recorded in a disc or there is a defect in a disc so that data cannot be reproduced, a conventional apparatus cannot promptly deal with such a case. There are consequently problems such that data cannot be reproduced by promptly skipping the defect or the like and a sound in which data is skipped by the defect or the like is generated as it is.

SUMMARY OF THE INVENTION

It is, therefore, an object of the invention to provide a useful optical disc reproducing apparatus which can preliminarily read and edit audio data to be reproduced and generate the edited audio data.

According to an aspect of the invention, there is provided an optical disc reproducing apparatus for reproducing recording data recorded on an optical disc, comprising:

reproducing means for reproducing the recording data recorded on the optical disc;

storing means for storing the recording data reproduced by the reproducing means;

input means for inputting at least one address of the recording data stored in the storing means;

output means of at least one system for outputting the recording data stored in the storing means; and control means for controlling so as to read the recording data based on the address inputted by the input means and to output the recording data from the output means.

The above and many other objects, features, and advantages of this invention will be more fully understood from the ensuing detailed description of the preferred embodiments, which is to be considered in connection with the accompanying drawings.

BRIEF DESCRIPTION OF THE DRAWINGS

A detailed description of the preferred embodiments of the invention is provided herein with reference to the accompanying drawing figures where.

DETAILED DESCRIPTION OF PREFERRED EMBODIMENTS

Figure 1:
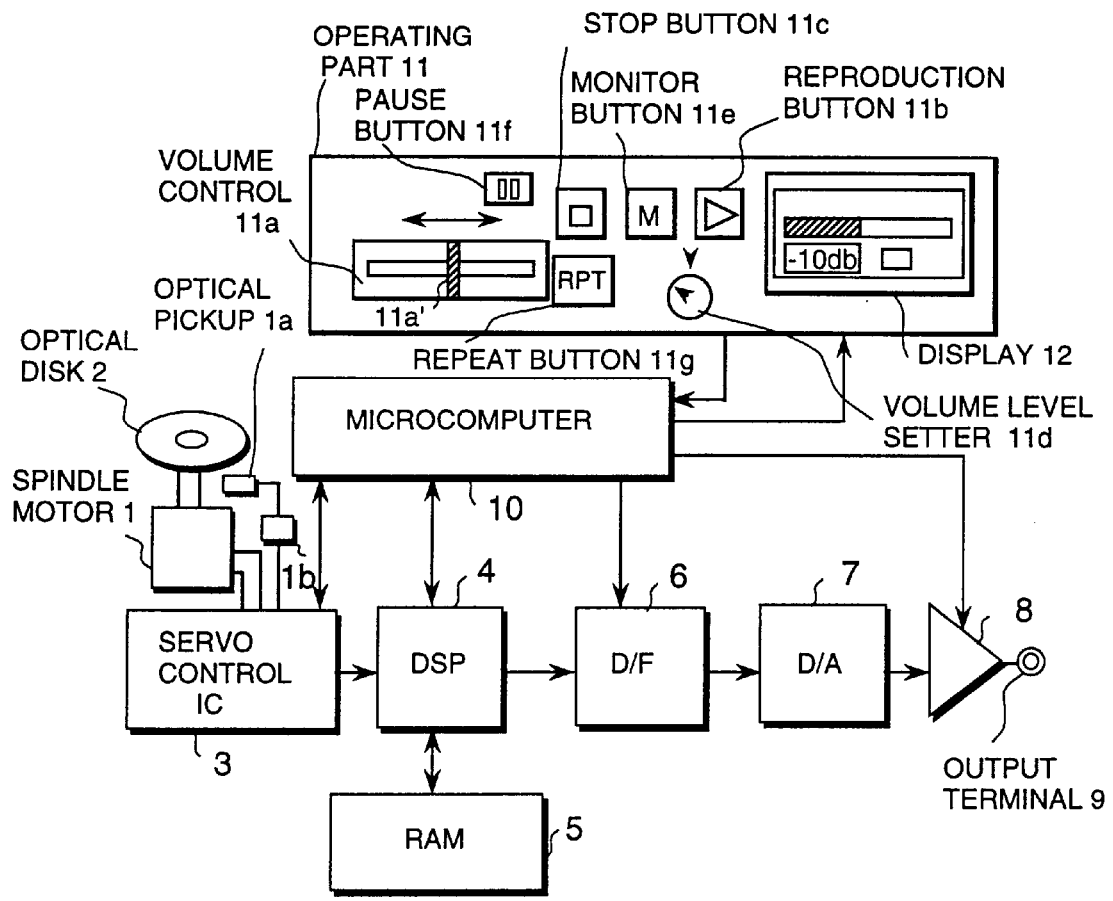
FIG. 1 is a block diagram showing an embodiment of an optical disc reproducing apparatus of the invention.

FIG. 1 is a block diagram showing an embodiment of the optical disc reproducing apparatus of the invention. The number of rotations of an optical disc 2 attached to a spindle motor 1 is controlled by a servo control IC 3. A signal read from the optical disc 2 by an optical pickup 1a and amplified by a head amplifier 1b is demodulated by a demodulating circuit (not shown) in the servo control IC 3 to audio data and the audio data is outputted to a DSP (Digital Signal Processor) 4. The audio data processed by the DSP 4 is stored in a RAM (Random Access Memory) 5. The audio data read from the RAM 5 by the DSP 4 is interpolated and filtered by a D/F (Digital Filter) 6 and is digital-analog converted by a DA (Digital Analog) converter 7 and resultant data is outputted from an output terminal 9 via an amplifier 8.

The servo control IC 3, DSP 4, D/F 6, and amplifier 8 are controlled by a microcomputer 10. The level of an output of the amplifier 8 is variably controlled by the microcomputer 10. A reproducing position of the audio data is instructed by a volume control 11a of an operating part 11. The operating part 11 has a reproduction button 11b, a stop button 11c, a volume level setter 11d for setting the maximum value of the audio level, a monitor button 11e, a pause button 11f, and a repeat button 11g.

The operating part 11 also includes a display 12 such as a liquid crystal display on which the sound level and the reproducing position of the audio data are displayed.

Figure 2:
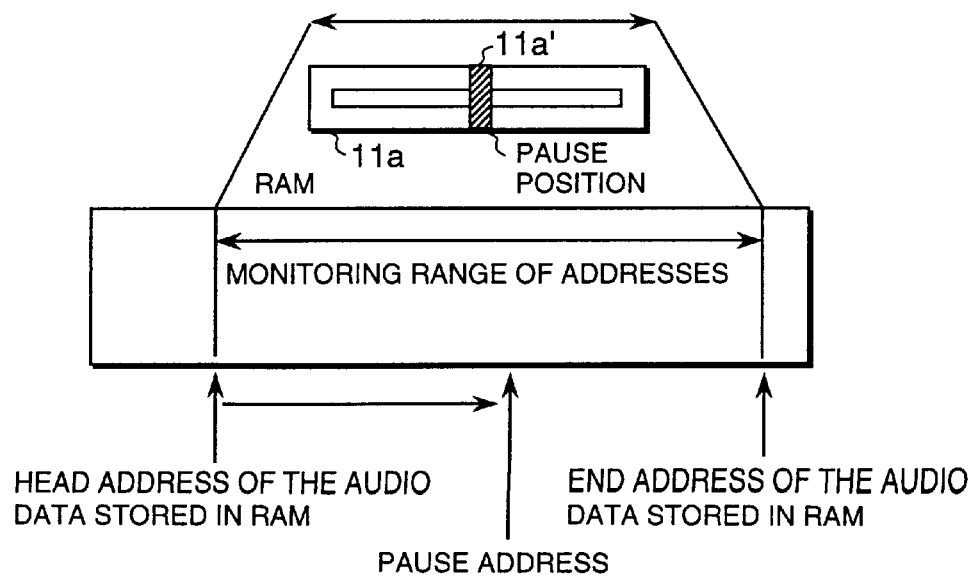
FIG. 2 is a diagram illustrating a volume control in the optical disc reproducing apparatus according to the embodiment of the invention.

FIG. 2 is a diagram illustrating the volume control in the optical reproducing apparatus according to the embodiment of the invention.

A position indicated by an indicator 11a' of the volume control 11a and an address of the audio data stored in the RAM 5 correspond to each other. A start address of the audio data is changed in accordance with the movement of the indicator 11a'.

For example, when the indicator 11a' is moved to the left end of the volume control 11a, the audio data is read from the head address. When the pause button 11f is depressed after operating the indicator 11a', the address when the pause button 11f is depressed is decided, so that data between two positions can be designated.

Although the volume control in a sliding type is used in the embodiment, a volume control of another type, for example, a rotating type can be also used as long as a positional relation with the address in the RAM 5 is known.

When the monitor button 11e is depressed, the audio data is started to be stored in the RAM 5 and the recording operation is stopped after storing the audio data of a predetermined memory capacity. When the reproduction button 11b is depressed and actual reproduction is started, the reading operation is started from the head address of the audio data stored in the RAM 5 and the read data is outputted from the output terminal 9 via the D/F 6, D/A converter 7, and amplifier 8. Simultaneously, a connecting part of the audio data stored in the optical disc 2 is detected from the end address of the audio data stored in the RAM 5 and the audio data read from the optical disc 2 is started to be stored in the RAM 5 subsequent to the end address of the audio data stored in the RAM 5.

With the construction shown in FIG. 1, the audio data cannot be monitored as a sound but the level can be monitored by the display 12. The maximum level value of the sound to be outputted is set by the volume level setter 11d, and the level of the sound to be outputted is monitored by the DSP 4 and is controlled by the microcomputer 10 so as not to exceed the maximum level value.

When the indicator 11a' of the volume control 11a is operated to designate two points and the repeat button 11g is depressed once, the audio data between the two points is read once and reproduced or monitored. When the repeat button 11g is depressed twice successively, the audio data between the two points can be repeatedly reproduced and monitored. Parts exceeding the maximum level value of the sound can be easily and preliminarily confirmed by the display 12.

For example, when two or more optical disc reproducing apparatus as mentioned above are used, audio data can be outputted after matching the output level of a sound to be outputted ahead and that of a sound to be subsequently outputted. An unnatural sound output occurring due to the level difference of sounds when a sound is switched to another sound can be prevented.

Figure 3:
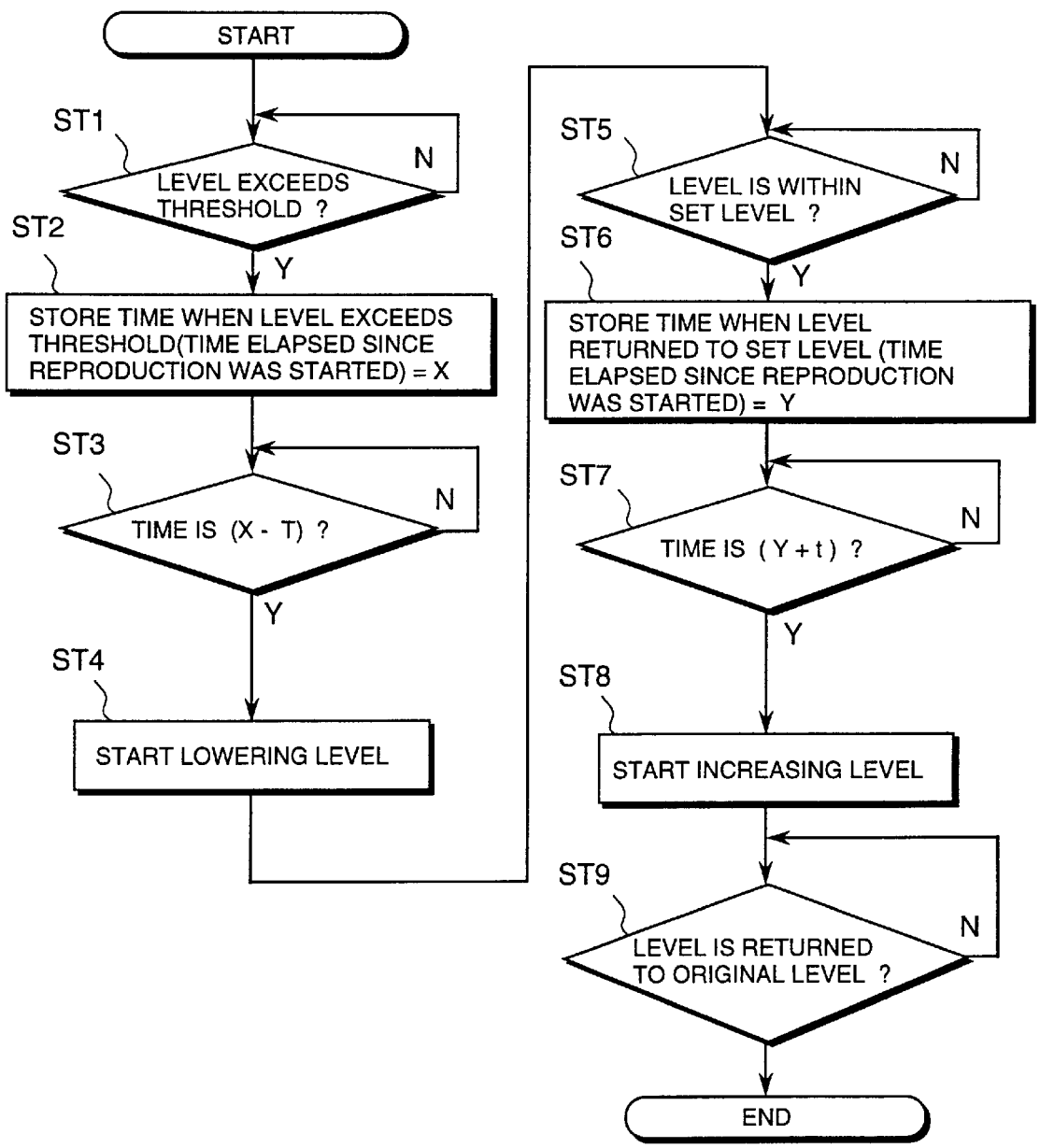
FIG. 3 is a flowchart showing an operation of the optical disc reproducing apparatus according to the embodiment of the invention.
Figure 4:
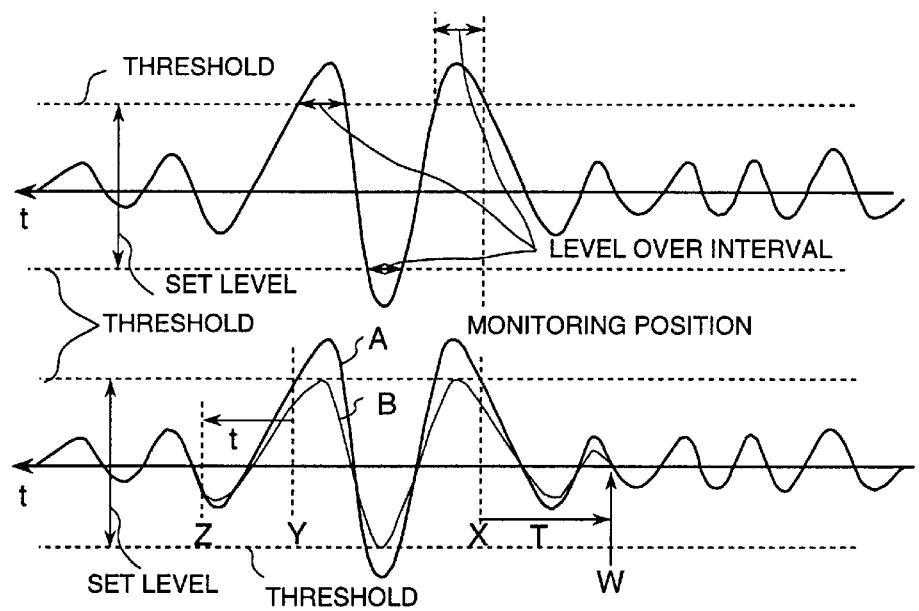
FIG. 4 is a diagram showing a control of the level of audio data reproduced by the optical disc reproducing apparatus according to the embodiment of the invention.

FIG. 3 is a flowchart showing an operation of the optical disc reproducing apparatus according to an embodiment of the invention. FIG. 4 is a diagram illustrating the level control of the audio data of the optical disc reproducing apparatus according to the embodiment of the invention.

The maximum level value of the sound to be outputted is preset by the volume level setter 11d of the operating part 11. In step ST1, it is judged whether a signal level of the audio data exceeds the maximum level value (predetermined threshold level) or not. When the signal level exceeds a predetermined threshold level (Y in step ST1), the DSP 4 notifies the microcomputer 10 of the level over. In step ST2, time X when the signal level exceeds the threshold is stored in the RAM 5 as shown in FIG. 4. Considering a delay of an output, when the microcomputer 10 detects that time is X−T (W in FIG. 4) (Y in step ST3) by going back time from the time X by a time T (for example, about 1 second), the level is started to be lowered in step ST4.

The microcomputer 10 gradually attenuates the level of the audio data until the level of a waveform A is reduced to the level of a waveform B. It is judged in step ST5 whether the level is within set level or not. When it is in the predetermined set level (Y in step ST5), time Y when the level is returned to the predetermined set level is stored in the RAM 5 in step ST6. In step ST7, when time reaches Y+t (Z in FIG. 4) (Y in step ST7), in order to return the audio data to the original level at the point Z, the microcomputer 10 variably changes an attenuation rate, for example, to 0.7, 0.8, 0.9, and 1 so as to raise the level in step ST8, thereby returning the level to the original level. When it is detected in step ST9 that the level is returned to the original level (Y in step ST9), the processing routine is finished.

Figure 5:
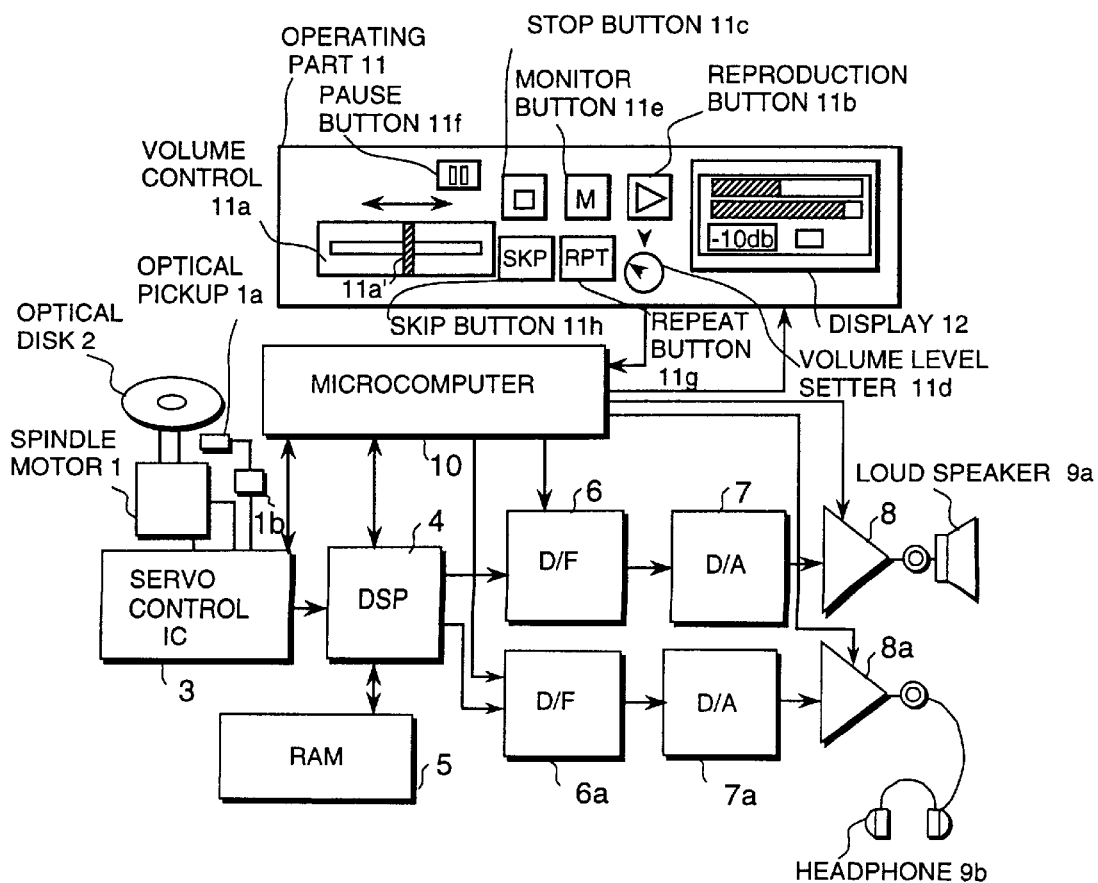
FIG. 5 is a block diagram showing another embodiment of the optical disc reproducing apparatus of the invention.

FIG. 5 is a block diagram showing another embodiment of the optical disc reproducing apparatus of the invention. Descriptions of components similar to those in the block diagram of FIG. 1 are omitted here. In FIG. 5, the audio data is outputted from a loud speaker 9a connected to the amplifier 8. A headphone 9b for monitoring is provided and the audio data stored in the RAM 5 is outputted via the DSP 4, D/F 6a, D/A converter 7a, amplifier 8a, and headphone 9b.

The operation of the optical disc reproducing apparatus will be described hereinbelow with reference to FIG. 5.

When the monitor button 11e is depressed, the audio data is read from the optical disc 2 and is stored into the RAM 5. The audio data read out from the RAM 5 can be monitored by the headphone 9b. When the reproduction button 11b is depressed, the audio data is started to be outputted from the loud speaker 9a. Since the audio data can be monitored by the headphone 9a before outputting it from the loud speaker 9a, the audio data to be outputted can be edited previously.

For example, in case of pausing in a position, when the user depresses the pause button 11f while monitoring the audio data by using the headphone 9b, the audio data is paused in the position when the pause button 11f is depressed, so that the address corresponding with the paused position is the start address when the audio data will be reproduced next. Further, by moving the indicator 11a' of the volume control 11a to the right and left with respect to the paused position, the audio data preceding and subsequent to the paused position can be monitored. Therefore, the start position when the audio data will be reproduced next can be accurately decided.

The indicator 11a' is moved to the head and the end of certain data in audio data and the two points are decided by depressing the pause button 11f, thereby enabling data in a specific interval to be selected. When the repeat button 11g is depressed after the selection, the data in the interval can be reproduced once or repeatedly. The data in the interval can be accurately confirmed by being monitored repeatedly. Further, when a skip button 11h is depressed, data is reproduced while skipping data in the selected interval. By using the monitoring function of the skip button 11h, for example, even if there is a noise defect in the disc, the noise defect can be preliminarily confirmed. Consequently, a defective output from the speaker 9a can be avoided. The embodiment is effective in live broadcasting by a DJ or the like who prepares a plurality of audio data to be reproduced next during outputting a sound.

According to the invention, there are comprised the storing means for reading the recording data recorded on the optical disc and storing the read data, the output means for outputting the recording data stored in the storing means, and the input means for inputting the address of the recording data stored in the storing means, and it is controlled so that the reading operation of the recording data is started from an address inputted by the inputting means. Therefore, the recording data can be outputted from the inputted address and monitored.

According to the invention, there are comprised the storing means for reading the recording data recorded on the optical disc and storing the read data, the output means for outputting the recording data stored in the storing means, and the input means for inputting the address of the recording data stored in the storing means, and it is controlled so that the reading operation of the recording data is stopped at an address inputted by the input means. Therefore, the output of the recording data can be stopped from the inputted address. Since the audio data can be paused, the head of data can be searched.

According to the invention, there are comprised the storing means for reading the recording data recorded on the optical disc and storing the read data, the output means for outputting the recording data stored in the storing means, and the input means for inputting the address of the recording data stored in the storing means, and it is controlled so that the recording data between two addresses inputted by the input means can be repeatedly read. Therefore, the recording data between the inputted addresses can be repeatedly outputted. Therefor, recorded sounds present in a specific part of the recording data can be reproduced.

According to the invention, there are comprised the storing means for reading the recording data recorded on the optical disc and storing the read data, the output means for outputting the recording data stored in the storing means, and the input means for inputting the address of the recording data stored in the storing means, and it is controlled so as to read the recording data while skipping recording data between two addresses inputted by the input means. Therefore, the recording data can be outputted while skipping the recording data between the inputted addresses. When there is a noise defect in the disc, the audio data can be reproduced while skipping the defective part.

According to the invention, since there is comprised the judging means for judging the level of the recording data between the addresses inputted by the input means of the optical disc reproducing apparatus, the output level of the recording data can be adjusted.

According to the invention, a volume control for variably inputting the address is used as the input means in the optical disc reproducing apparatus and an address position of the recording data stored in the storing means and a position in the volume control are related, so that the position of the inputted address of the recording data stored in the storing means can be visually confirmed. When the recording data is data of a musical piece, the reproducing position of the piece can be easily obtained. It is, therefore, easy to search and reproduce recorded sounds. In a specific part.

According to the invention, there are provided the storing means for reading the recording data recorded on the optical disc and storing the read data, the output means for outputting the stored recording data, and the input means for inputting the address of the recording data stored in the storing means, and it is controlled so as to start or stop the reading operation of the recording data from the address inputted by the input means, so that the recording data between the inputted addresses can be preliminarily read and edited. Consequently, the useful optical disc reproducing apparatus which can prevent inconveniences such that the sound in which a part of audio data is skipped due to the defect in the disc is generated as it is.

While the invention has been particularly shown and described with reference to preferred embodiments, it will be understood by those skilled in the art that various changes in form and details may be made therein without departing from the spirit and scope of the invention. Accordingly, the methods and apparatus disclosed herein are to be considered as merely illustrative, and not limiting of the invention.

What is claimed is:

1. An optical disc reproducing apparatus for reproducing recording data recorded on an optical disc, comprising:
   a reproducing means for reproducing the recording data recorded on the optical disc;
   a storing means for storing the recording data reproduced by the reproducing means;
   an input means for inputting at least one arbitrary address of the recording data stored in the storing means;
   an output means for outputting the recording data stored in the storing means; and
   a control means for controlling the storing means, the input means, and the output means so as to read the recording data from the storing means based on the address inputted by the input means and to output the recording data from the output means.

2. The optical disc reproducing apparatus of claim 1, further comprising judging means for judging a level of the recording data between addresses inputted by the input means.

3. The optical recording apparatus according to claim 1, wherein, said control means controls the input, output, and storing means so as to read the recording data from an address inputted by the input means and to output the recording data from the output means.

4. The optical recording apparatus according to claim 1, wherein, said control means controls the input, output, and storing means so as to stop reading the recording data at an address inputted by the input means.

5. The optical recording apparatus according to claim 1, wherein said control means controls the input, output, and storing means so as to read the recording data between two addresses inputted by the input means and to output the recording data from the output means.

6. The optical recording apparatus according to claim 1, wherein, said control means controls the input, output, and storing means so as to read the recording data stored in the storing means by skipping data between two addresses inputted by the input means and to output the recording data to the output means.

7. The optical recording apparatus according to claim 2 wherein said judging means includes;
   monitoring means for monitoring a level of the recording data,
   comparing means for comparing the level of the recording data monitored by the monitoring means with a threshold level,
   first time storing means for storing a first time when the level of the recording data exceeds the threshold level,
   reducing means for reducing the level of the recording data at a time when it goes back time from the first time by predetermined time,
   second time storing means for storing a second time when the level of the recording data is within the threshold level, and
   raising means for raising the level of the recording data so as to return the level of the recording data to the original level of the recording data by a time when it gain predetermined time from the second time.

8. The optical recording apparatus according to claim 1, wherein the input means is operable to input any address of the storing means.

9. The optical recording apparatus according to claim 2, wherein said control means controls the input, output and storing means so as to read the recording data from an address inputted by the input means and to output the recording data from the output means.

10. The optical recording apparatus according to claim 2, wherein said control means controls the input, output and storing means so as to stop reading the recording data at an address inputted by the input means.

11. The optical recording apparatus according to claim 2, wherein said control means controls the input, output and storing means so as to read the recording data between two addresses inputted by the input means and to output the recording data from the output means.

12. The optical recording apparatus according to claim 2, wherein said control means controls the input, output and storing means so as to read the recording data stored in the storing means by skipping data between two addresses inputted by the input means and to output the recording data from the output means.

13. The optical recording apparatus according to claim 2, wherein the input means is operable to input any address of the storing means.

14. The optical recording apparatus according to claim 3, wherein the input means is operable to input any address of the storing means.

15. The optical recording apparatus according to claim 4, wherein the input means is operable to input any address of the storing means.

16. The optical recording apparatus according to claim 5, wherein the input means is operable to input any address of the storing means.

17. The optical recording apparatus according to claim 6, wherein the input means is operable to input any address of the storing means.

18. The optical recording apparatus according to claim 7, wherein the input means is operable to input any address of the storing means.

19. An optical disc reproducing apparatus for reproducing recording data recorded on an optical disc, comprising:

an optical disc drive for reproducing recording data recorded on an optical disc;

a memory unit for storing the recording data reproduced by said optical disc drive;

an input device for inputting at least one arbitrary address of the recording data stored in the memory unit;

an output device for outputting the recording data stored in the memory unit; and a controller for controlling the memory unit, the input device and the output device so as to read tie recording data from the memory unit based on the address inputted by the input device and output the recording data from the output device.

20. The optical disc reproducing apparatus of claim 19, wherein input device is an indicator located on a volume control device, and wherein the position of the indicator indicates the particular address chosen.

21. The optical disc reproducing apparatus of claim 20, wherein the output device does not output recording data located in memory positions after the address position chosen by said indicator.

22. The optical disc reproducing apparatus of claim 20, wherein said indicator can indicate more than one address.

23. The optical disc reproducing apparatus of claim 22, wherein the output device outputs recording information located in the memory positions between two addresses chosen by the input device.

24. The optical disc reproducing apparatus of claim 22, wherein the output device does not output the recording information which is located in the memory positions between two addresses chosen by the input device.

25. The optical disc reproducing apparatus according to claim 19, wherein the output device comprises a pair of headphones.

26. The optical disc reproducing apparatus according to claim 19, wherein the output device comprises a speaker.

27. A method of reproducing recording data recorded on an optical disc comprising the steps of:

reproducing recording data recorded on an optical disc;

storing said recording data into a memory unit;

selecting an arbitrary address of the memory unit using an input device;

controlling the memory unit so as to output the recording data from the memory unit based on the address selected by the input device; and outputting the selected recording data.

* * * * *